United States Patent

Corby et al.

[15] 3,673,099

[45] June 27, 1972

[54] PROCESS AND COMPOSITION FOR STRIPPING CURED RESINS FROM SUBSTRATES

[72] Inventors: William Joseph Corby, Allentown; Victor Charles Garbarini; Malcolm Lunt White, both of Bethlehem, all of Pa.

[73] Assignee: Bell Telephone Laboratories, Incorporated, Murray Hill, Berkeley Heights, N.J.

[22] Filed: Oct. 19, 1970

[21] Appl. No.: 81,754

[52] U.S. Cl. ....................252/156, 117/43, 117/63, 134/38, 252/DIG. 8, 252/158

[51] Int. Cl. ....................C11d 7/06

[58] Field of Search ....................252/156, 158, DIG. 8; 134/38; 117/43, 63

[56] References Cited

UNITED STATES PATENTS

| | | | |
|---|---|---|---|
| 3,551,204 | 12/1970 | Bolger et al. | 252/158 X |
| 2,710,843 | 6/1955 | Stebleton | 252/158 |
| 2,897,104 | 7/1959 | Duncan | 234/38 X |
| 2,662,837 | 12/1953 | Duncan | 134/38 X |
| 2,978,421 | 4/1961 | Holloway | 134/38 X |

OTHER PUBLICATIONS

" Methyl Pyrrolidone" Antara Chemicals, N.Y., N.Y. 9/61 pages 19, 24 and 25

*Primary Examiner*—Mayer Weinblatt
*Attorney*—R. J. Guenther and Edwin B. Cave

[57] ABSTRACT

Cured resins, such as silicones or polyvinyl cinnamate are stripped from substrates by exposure to a mixture of N-methyl-2-pyrrolidone and a strong base, such as an alkyl or substituted alkyl ammonium hydroxide, to which may be added other compatible organic solvents such as ethylene glycol monoethyl ether.

7 Claims, 1 Drawing Figure

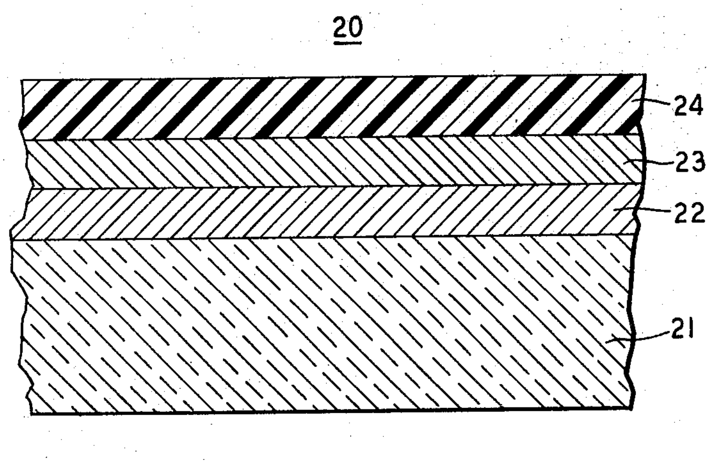
INVENTORS W. J. CORBY
V. C. GARBARINI
M. L. WHITE
BY
ATTORNEY

PROCESS AND COMPOSITION FOR STRIPPING CURED RESINS FROM SUBSTRATES

BACKGROUND OF THE INVENTION

1. Field of the Invention

This invention relates to a composition for stripping cured resins from substrates covered with such resins and to the stripping process using such compositions.

2. Description of the Prior Art

In the manufacture of diverse electrical apparatus such as cable assemblies, connectors, coils, modules, transformers and controls, it is often necessary to perform encapsulations or coverings with polymeric materials or resins. This is especially true for the production of semiconductor devices and integrated circuits which must be protected from moisture and mechanical damage by an encapsulation or coating process. A particular problem is encountered when the encapsulation or coating material has to be removed from the substrate without damage thereto or contamination thereof.

Both mechanical and chemical processes are known for the removal of the aforementioned cured resinous coatings from a substrate, but these processes leave much to be desired. If the cured coating is mechanically stripped as by scraping, the removal of the material is almost invariably accompanied by some physical damage. The use of certain chemical reagents or solvents, formerly employed, is unsatisfactory since they dissolve the cured resins either too slowly or incompletely or both, or they comprise the electrical reliability by leaving residual contaminants which are not completely removed by subsequent processing. A solvent or stripping solution which will both quickly and completely remove the aforementioned cured resins from the substrates without damage or contamination thereof is therefore needed.

SUMMARY OF THE INVENTION

According to the present invention, such a solvent or stripping solution comprises mixtures of N-methyl-2-pyrrolidone and a strong base, to which may be added other compatible organic solvents, such as ethylene glycol monomethyl ether. The stripping is effected by treating or exposing the cured resin-coated substrate to the stripping solution for a period of time sufficient to remove the requisite amount of the cured resin from the surface areas of the substrate. These solvents are particularly effective for stripping cross-linked silicones and vinyl polymers, such as polyvinyl cinnamate.

DESCRIPTION OF THE DRAWING

The present invention will be more readily understood by reference to the following drawing taken in conjunction with the detailed description wherein the FIGURE is a cross-sectional view of a typical thin film structure which has been coated with resin to be stripped by the composition and process of the present invention.

DETAILED DESCRIPTION

The present invention is based upon the discovery of a unique solvent system for dissolving, removing, or stripping cured resins from a substrate.

The stripping solution is made up of a strong base dissolved in N-methyl-2-pyrrolidone with or without an additional organic solvent. Suitable bases or solute materials are the inorganic alkali hydroxides, organic bases such as guanidine carbonate and alkyl or aralkyl ammonium hydroxides having the general formula, $$(R)_{4-x}-\underset{\underset{(R')_x}{|}}{N^+}-OH^-$$

where $x$ is a value ranging from 0 to 4, R is an alkyl radical having the general formula $C_nH_{2n+1}$ where $n$ is an integer ranging from 1 to 4 and R' is an aryl substituted alkyl radical having the general formula

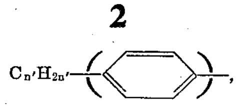

where $n'$ is an integer ranging from 1 to 4.

It should be pointed out that the alkyl or aralkyl ammonium hydroxides are not stable as free bases as such and are either prepared as hydrates or prepared and maintained in solution form, in a dissociating medium, such as water or methanol, for example. When the organic base is incorporated into the stripping composition as such a solution, the solvent may remain as an innocuous component of the final stripping composition. Ordinarily such a solvent will be present in the final composition in amounts not exceeding 10 times, and more commonly not exceeding 4 times, the weight of the organic base. It should also be pointed out that where the substrate selected is a thin film circuit or integrated circuit the use of inorganic alkali hydroxides may not be tolerated and, in such cases, the organic bases should be used.

Other miscible organic solvents, such as ethylene glycol monomethyl ether, may be added, if desired, in amounts up to a volume about 4 times the volume of N-methyl-2-pyrrolidone present. Preferably, however, the total volume of other solvents present does not exceed the volume of N-methyl-2-pyrrolidone.

The solute or basic material selected is dissolved or combined with the solvent mixture to form the solvent or stripping solution. The amount of solute or base selected may range from small amounts, such as 0.1 per cent by weight, up to a maximum which corresponds to the saturation level in the solvent mixture at the temperature of dissolution. Ordinarily amounts between one-half per cent and 4 per cent by weight will be used.

The cured resin-coated substrate is immersed in the stripping solution at a temperature ranging from 25° C. to the boiling point of the stripping solution for a period of time sufficient to dissolve or strip the requisite amount of the cured resin. In this regard, it should be pointed out that the temperature employed and the time of treating the coated substrate are interdependent and are both dependent upon the curing time and curing temperature of the resin as well as upon the aging of the cured resin at room temperature or above.

The compositions of the present invention are effective for the stripping of cured resins, cross-linked to an insoluble state, particularly where the resins are cross-linked by condensation linkages. Where resins are to be removed from the surfaces of semiconductors or thin film circuitry without damaging or contaminating them, the compositions wherein the strong base is an alkyl or aralkyl ammonium hydroxide are particularly desirable. Resins commonly deposited in a cured, infusible, insoluble state on semiconductor or thin film surfaces are the silicone resins, particularly methyl phenyl silicones, and polyvinyl cinnamate. Such resins are readily stripped according to the present invention without contamination of the substrate.

Specific examples of the stripping or dissolution of cured resins are as follows:

EXAMPLE 1

Referring to the figure, a typical thin film structure was selected as the substrate 20. The substrate 20 was comprised of a 99% $Al_2O_3$ ceramic base layer 21 upon which was deposited, by standard techniques known in the art, a first layer of titanium 22 and a second layer of gold 23. A xylene solution of methyl-phenyl polysiloxane resin, having a ratio of silicon to methyl and phenyl substituents of 1:1 and having a methyl to phenyl ratio of 25:1 was obtained from commercial sources. The uncured resin solution had a minimum per cent solids content after 3 hours at 135° C. of 50 percent. The viscosity of the uncured resin solution was 100 centipoise at 25° C. and its specific gravity at 25° C. was 1.015 ±0.015.

The uncured resin solution was further diluted with xylene, in the ratio of 3 parts by volume of the resin solution to 1 part by volume of xylene, and sprayed on the substrate 20 to form a coating 24 which upon curing gave a layer or coating 24, 0.5 mil in thickness. The uncured coating 24 was then heat treated in a 3-step cycle. The uncured coating 24 was first heated at 120° C. for 1 hour, followed by a second stage heating at 150° C. for 1 hour, followed by a third and final stage heating at 300° C. for 4 hours. After the third stage heating, the methylphenyl polysiloxane resin was completely cured.

A stripping solution was then prepared. First 20 percent by volume of commercially obtained ethyleneglycol monomethyl ether and 80 percent by volume N-methyl-2-pyrrolidone, commercially obtained, were combined with one another to form a solvent mixture. To the solvent mixture was added at 25° C. a sufficient amount of the base or solute, guanidine carbonate, to form a saturated solution thereof, which saturated solution comprised the stripping solution. The guanidine carbonate was commercially obtained. The resultant cured resin-coated substrate 20 was then exposed to the stripping solution by being immersed therein at a temperature of 65° C. for 3 minutes resulting in a 100 percent removal of the cured resin layer 24. The removal of the resin layer was determined optically through microscopic examination of the substrate 20.

EXAMPLE 2

The procedure of Example 1 was repeated except that the solvent mixture consisted of 25 percent by volume of ethyleneglycol monomethyl ether and 75 percent by volume of N-methyl-2-pyrrolidone and the amount of guanidine carbonate dissolved therein was one-half gram / 100 ml of the solvent mixture. The resultant cured resin-coated substrate 20 was immersed in the stripping solution at 65° C. for a period of 8 minutes resulting in a 100 percent removal of the cured resin layer 24 as determined via microscopic examination.

EXAMPLE 3

The procedure of Example 1 was repeated except that the amount of guanidine carbonate dissolved in the solvent mixture was one-half gram / 50 ml of the solvent mixture. The resin-coated substrate was immersed in the stripping solution at 65° C. for a period of 5 minutes resulting in a 100 percent removal of the cured resin layer 24 as determined by microscopic examination.

EXAMPLE 4

The procedure of Example 3 was repeated except that the resin was heated in the third stage of curing at 300° C. for 72 hours. The resin-coated substrate was then treated with the stripping solution at 95° C. for a period of 8 minutes resulting in 100 percent removal of the cured resin layer as determined microscopically.

EXAMPLE 5

The coating and curing procedure of Example 4 was repeated. The solvent mixture prepared, however, contained 25 percent by volume ethyleneglycol monomethyl ether and 75 percent by volume N-methyl-2-pyrrolidone into which was dissolved one-half gram of guanidine carbonate / 100 ml of the solvent mixture. The resultant resin-coated substrate was exposed to the stripping solution for 8 minutes at 90° C. resulting in the 100 percent removal of the cured resin layer 24 as determined microscopically.

EXAMPLE 6

The procedure of Example 5 was repeated except that the resin was cured in the third heating stage for four hours at 300° C. The cured resin was 100 percent removed, after 5 minutes at 90° C., as determined optically.

EXAMPLE 7

The coating and curing procedure of Example 1 was repeated. The stripping solution, however, comprised a solvent mixture of 25 percent by volume ethyleneglycol monomethyl ether and 75 percent by volume N-methyl-2-pyrrolidone, and a solute of tetramethyl ammonium hydroxide, $(CH_3)_4\,N^+ — OH^-$. The tetramethyl ammonium hydroxide was combined with the solvent mixture in a concentration of 1 gram per 40 ml of the solvent mixture. The solute was added to the solvent mixture in the form of a 10 percent by weight aqueous solution commercially obtained.

The resultant cured resin-coated substrate was immersed in the stripping solution at 60° C. for 2 minutes resulting in a 99 percent removal of the resin layer as determined microscopically.

EXAMPLE 8

The procedure of Example 7 was repeated except that the substrate was treated at 65° C. for 2 minutes resulting in a 100 percent removal of the resin layer.

EXAMPLE 9

The procedure of Example 8 was repeated except that the third stage of the resin-curing step was carried out at 300° C. for 72 hours. Also, the tetramethyl ammonium hydroxide was introduced as a 24 weight per cent in methanol solution. After two minutes of treatment at 65° C. there was 100 percent removal of the cured resin as determined microscopically.

EXAMPLE 10

The procedure of Example 9 was repeated except that the third stage of the resin-curing step was carried out at 300° C. for 92 hours. The resultant resin-cured coated substrate 20 was then treated at 80° C. for 2 minutes resulting in 100 percent removal of the cured resin as determined optically.

EXAMPLE 11

The procedure of Example 9 was repeated. The substrate, however, was treated at 80° C. for 1 minute resulting in a 100 percent removal of the cured resin as determined microscopically.

EXAMPLE 12

The coating and curing procedure of Example 11 was repeated except that the third stage of the curing was performed at 300° C. for 116 hours. A stripping solution was prepared comprising a solvent of 100 percent by volume N-methyl-2-pyrrolidone and a solute of tetramethyl ammonium hydroxide. The solute was present in a concentration of 1 gram / 50 ml of the solvent. The tetramethyl ammonium hydroxide was added to the N-methyl-2-pyrrolidone in the form of a 24 percent by weight methanol solution. The resultant cured resin was exposed to the stripping solution at a temperature of 70° C. for two minutes resulting in a 100 percent removal of the cured resin as determined by microscopic examination.

EXAMPLE 13

The coating and curing procedure of Example 1 was repeated except that the first and second stage heating steps were carried out for 15 minutes and the third stage was carried out for 1 hour. The stripping solution of Example 12 was applied to the surfaces of the cured resin-coated substrate at 25° C. for 15 seconds resulting in 100 percent removal of the cured resin coating or layer as determined optically.

EXAMPLE 14

The procedure of Example 1 was repeated except that the third stage of the curing cycle was carried out at 300° C. for 116 hours. The stripping solution of Example 13 was used and 100 percent removal of the cured resin was accomplished after five minutes at room temperature as determined by microscopic examination.

EXAMPLE 15

The coating and curing procedure of Example 1 was repeated except that the cured resin had a thickness of 1.7 ml. A stripping solution consisting of 4 parts by weight benzyl trimethyl ammonium hydroxide

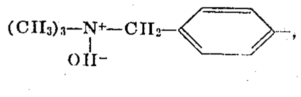

to 100 parts be weight N-methyl-2-pyrrolidine was made up. The solute or base material, i.e., the benzyl trimethyl-ammonium hydroxide was combined with the N-methyl-2-pyrrolidone in the form of a 40 percent by weight in methanol solution and was commercially obtained.

The resultant cured resin-coated substrate was exposed to the stripping solution at 65° C. for a period of 30 seconds resulting in 100 percent removal of the resin coating or layer as determined by microscopic examination.

EXAMPLE 16

The coating and curing procedure of Example 1 was repeated, except that the cured resin had a thickness of 1.7 microns. A stripping solution consisting of 100 parts by weight N-methyl-2-pyrrolidone and 4 parts by weight of tetrabutyl ammonium hydroxide $(C_4H_9)_4 - N^+ - OH^-$ was prepared. The tetrabutyl ammonium hydroxide was combined with the N-methyl-2-pyrrolidone in the form of a methanol solution. The cured resin was immersed in the stripping bath at 65° C. for 30 seconds resulting in 100 percent cured resin removal.

EXAMPLE 17

The substrate 20 described in Example 1 was used. KPR photoresist solution obtained from Eastman Kodak was applied to the substrate so as to form a cured resin having a thickness of 1.7 microns. The KPR photoresist solution comprised a polyvinyl cinnamate resin and ethyleneglycol monomethyl ether acetate solvent. The polyvinyl cinnamate resin-containing solution had a viscosity of 11.7 centipoise at 25° C. It also had a weight percent of solids of 6.6. The resin solution was applied to the substrate 20 and baked at 150° C. for 30 minutes thereby forming a cured polyvinyl cinnamate resin coating or layer 24. The cured resin had a number average molecular weight of 20,000. The cured resin was then aged at 25° C. for 3 weeks.

The cured, aged, resin-coated substrate was then exposed to the stripping bath described in Example 12 at a temperature of 65° C. for 30 seconds resulting in 100 percent removal of the cured polyvinyl cinnamate resin as determined by microscopic examination.

EXAMPLE 18

The coating and curing procedure of Example 17 was repeated. The stripping solution was that of Example 15. The cured polyvinyl cinnamate resin-coated substrate was treated with the stripping solution at 65° C. for one minute resulting in the complete removal of the cured resin as determined microscopically.

What is claimed is:

1. Method of stripping a cured resin selected from the group consisting of methyl phenyl silicones and polyvinyl cinnamates which comprises contacting the resin with a stripping solution consisting essentially of:

I. a solute consisting of a strong base selected from the group consisting of
   a. inorganic alkali hydroxides;
   b. guanidine carbonate; and
   c. substituted ammonium hydroxides of the general formula $$(R)_{4-x}-\underset{\underset{(R')_x}{|}}{N}-OH$$

wherein $x$ ranges from 0 to 4, R is an alkyl radical having the general formula $C_nH_{2n+1}$, where $n$ is an integer from 1 to 4 and R' is an aryl substituted radical having the general formula

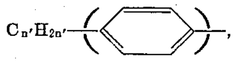

where n' is an integer ranging from 1 to 4; and

II. a solvent consisting essentially of N-methyl-2-pyrrolidone; the solute being present in an amount of at least 0.1 per cent by weight of the solution.

2. Method in accordance with claim 1 wherein said solvent contains ethylene glycol monomethyl ether, the volume ratio of ethylene glycol monomethyl ether to N-methyl-2-pyrrolidone ranging from 1:1 to 4:1.

3. The method of claim 1 wherein the strong base is tetramethyl ammonium hydroxide.

4. The method of claim 1 wherein the strong base is tetrabutyl ammonium hydroxide.

5. The method of claim 1 wherein the strong base is trimethylbenzyl ammonium hydroxide.

6. Composition for stripping a cured resin selected from the group consisting of methyl phenyl silicones and polyvinyl cinnamates consisting of a mixture of I. a solute consisting of a strong base selected from the group consisting of
   a. inorganic alkali hydroxides;
   b. guanidine carbonate; and
   c. substituted ammonium hydroxides of the general formula $$(R)_{4-x}-\underset{\underset{(R')_x}{|}}{N}-OH$$

wherein $x$ ranges from 0 to 4, R is an alkyl radical having the general formula $C_nH_{2n+1}$, where $n$ is an integer from 1 to 4 and R' is an aryl substituted radical having the general formula

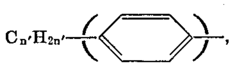

where $n'$ is an integer ranging from 1 to 4;

II. a solvent consisting essentially of N-methyl-2 -pyrrolidone; the solute being present in an amount of at least 0.1 per cent by weight of the solution; and III. a dissociating medium selected from the group consisting of water and methanol.

7. Composition in accordance with claim 6 wherein said solvent includes ethylene glycol monomethyl ether.

* * * * *